United States Patent Office 3,369,872
Patented Feb. 20, 1968

3,369,872
CATALYST FOR THE REACTION BETWEEN HYDROCARBONS AND SULFUR DIOXIDE FOR THE PREPARATION OF PURE SULFUR
Jon Aarvik, Trondheim, Norway, assignor to Norges Geologiske Undersokelse, Trondheim, Norway
No Drawing. Filed Aug. 10, 1965, Ser. No. 478,745
Claims priority, application Norway, Aug. 31, 1964, 154,592
1 Claim. (Cl. 23—226)

ABSTRACT OF THE DISCLOSURE

There is provided a process for the catalytic reaction of mineral oil with sulfur dioxide to produce sulfur. In such process, there is employed as a catalyst, cordierite or other materials having uniformly sized channels or pores of molecular dimensions in their structure, such as zeolites.

---

This invention relates to the catalytic reaction of hydrocarbons with sulfur dioxide, with or without a content of free oxygen, for the preparation of pure sulfur.

It is known that on attempts to produce elementary sulfur from sulfur dioxide by using hydrocarbons, such as mineral oil or methane, at temperatures between 800 and 1300° C., an undesired carbon formation will occur.

Effort has been made to avoid the above disadvantage by using bauxite or mullite containing material as catalyst for the reaction. However, it has been found that these materials are not able to prevent carbon formation.

According to the invention it has been found that the carbon formation can be essentially completely eliminated if there is used as catalyst for the reaction of mineral oil with sulfur dioxide to produce sulfur, cordierite or other materials having uniformly sized channels or pores of molecular dimensions in their structure, such as zeolites. The gaseous product is free of carbon, and the reaction substantially reaches equilibrium. Further, the gaseous product, when using the catalyst according to the invention, contains $SO_2$ and $H_2S$ in a ratio of 1:2 by volume, and the $SO_2$ and $H_2S$ content may be reacted in a known manner to form more sulfur.

Example I 480 ml./min. of sulfur dioxide was passed into a furnace filled with cordierite together with 0.2 g. of mineral oil per min. The temperature in the furnace was 1000° C. The gaseous product from the furnace was free of carbon and contained 5.2 volume percent of $SO_2$, 10.5 volume percent of $H_2S$, small amounts of carbon monoxide, and the rest was carbon dioxide, steam and sulfur.

Example II 480 ml./min. of sulfur dioxide was passed into a furnace filled with zeolite together with 0.22 g. of mineral oil per min. The temperature in the furnace was 900° C. The gaseous product from the furnace was free of carbon and contained 5.2 volume percent of $SO_2$, 11.0 volume percent of $H_2S$, small amounts of carbon monoxide, and the rest was carbon dioxide, steam and sulfur.

I claim:
1. In the process for the catalytic reduction of sulfur dioxide with mineral oil at a temperature of 800 to 1300° C. to produce sulfur, the improvement wherein the catalyst is cordierite.

References Cited

UNITED STATES PATENTS

| | | | |
|---|---|---|---|
| 1,840,450 | 1/1932 | Jaeger et al. | 252—455 X |
| 3,069,362 | 12/1962 | Mays et al. | 252—419 |
| 3,199,955 | 8/1965 | West et al. | 23—220 |

MILTON WEISSMAN, *Primary Examiner.*

OSCAR R. VERTIZ, *Examiner.*

A. J. GREIF, *Assistant Examiner.*